US012686529B2

(12) United States Patent
Henriques et al.

(10) Patent No.: US 12,686,529 B2
(45) Date of Patent: Jul. 21, 2026

(54) EXPANDABLE AND COLLAPSIBLE LID SYSTEM AND METHOD

(71) Applicant: Expanding Ideas Inc, Ocean View, DE (US)

(72) Inventors: Seth Luis Henriques, Lowell, MA (US); Miguel DeJesus Henriques, Ocean View, DE (US)

(73) Assignee: Expanding Ideas Inc, Ocean View, DE (US)

( * ) Notice: Subject to any disclaimer, the term of this patent is extended or adjusted under 35 U.S.C. 154(b) by 0 days.

(21) Appl. No.: 18/620,662

(22) Filed: Mar. 28, 2024

(65) Prior Publication Data

US 2024/0270444 A1 Aug. 15, 2024

Related U.S. Application Data

(63) Continuation-in-part of application No. 16/391,273, filed on Apr. 22, 2019, now abandoned.

(Continued)

(51) Int. Cl.

*B65D 51/16* (2006.01)
*B65D 21/02* (2006.01)

(Continued)

(52) U.S. Cl.

CPC ......... *B65D 21/0233* (2013.01); *B65D 21/08* (2013.01); *B65D 43/0218* (2013.01);

(Continued)

(58) Field of Classification Search

CPC .. B65D 21/0233; B65D 21/08; B65D 21/086; B65D 43/0218; B65D 51/16;

(Continued)

(56) References Cited

U.S. PATENT DOCUMENTS 1,913,652 A * 6/1933 Alexander ......... B65D 79/0087 220/624
5,439,128 A * 8/1995 Fishman .............. B65D 21/086 206/218

(Continued)

FOREIGN PATENT DOCUMENTS

WO WO-2016202591 A1 * 12/2016 ............. B65D 21/08

*Primary Examiner* — King M Chu

(74) *Attorney, Agent, or Firm* — Choate, Hall & Stewart LLP; Brian E. Reese; Sofia A. Santos

(57) ABSTRACT

An expandable and collapsible lid system and method thereof. The system includes at least one container including an opening and at least one corresponding lid. The lid may be operable between an expanded state, a middle state and a collapsed state. The lid includes a flange having a circumscribing lip for releasably sealing the opening of the container and concentric segments. Each concentric segment may be flexibly coupled to an adjacent concentric segment, inner-diameter to outer-diameter, a diameter of the concentric segments decreasing inversely with the distance of the concentric segment from the flange, a concentric segment having a largest diameter being flexibly coupled to the flange. When positioned atop the container, the lid increases a storage volume of the at least one container in the expanded state and forms a pool within the container for nesting of a further container when in the collapsed state.

17 Claims, 6 Drawing Sheets

Related U.S. Application Data

(60) Provisional application No. 62/660,672, filed on Apr. 20, 2018.

(51) Int. Cl.

| | |
|---|---|
| ***B65D 21/08*** | (2006.01) |
| ***B65D 43/02*** | (2006.01) |
| ***B65F 1/00*** | (2006.01) |
| ***B65F 1/16*** | (2006.01) |

(52) U.S. Cl.
CPC ............ *B65D 51/16* (2013.01); *B65F 1/0053* (2013.01); *B65F 1/1623* (2013.01); *B65D 2205/02* (2013.01); *B65D 2543/00314* (2013.01); *B65D 2543/0037* (2013.01); *B65D 2543/005* (2013.01); *B65D 2543/00537* (2013.01); *B65D 2543/00555* (2013.01); *B65D 2543/00833* (2013.01); *B65F 2001/1653* (2013.01); *B65F 2210/181* (2013.01); *B65F 2220/106* (2013.01); *B65F 2220/12* (2013.01); *B65F 2250/114* (2013.01); *B65F 2250/12* (2013.01)

(58) Field of Classification Search
CPC ...... B65D 2205/02; B65D 2543/00314; B65D 2543/0037; B65D 2543/005; B65D 2543/00537; B65D 2543/00555; B65D 2543/00833; B65D 2543/00092; B65D 2543/00296; B65D 2543/00351; B65D 2543/00509; B65F 1/0053; B65F 1/1623; B65F 2001/1653; B65F 2210/181; B65F 2220/106; B65F 2220/12; B65F 2250/114; B65F 2250/12; B65F 21/086
USPC .................................. 220/380, 287, 367.1, 8
See application file for complete search history.

(56) References Cited

U.S. PATENT DOCUMENTS

| | | | | | |
|---|---|---|---|---|---|
| 7,048,317 | B2 * | 5/2006 | Netsch | A47F 13/08 | 220/666 |
| 8,678,212 | B2 * | 3/2014 | Kim | B65D 41/22 | 215/320 |
| 2004/0206765 | A1 * | 10/2004 | McMahon, III | B65D 43/0222 | 220/780 |
| 2007/0228051 | A1 * | 10/2007 | Meroni | B65D 81/2038 | 220/580 |
| 2010/0200588 | A1 * | 8/2010 | Bergman | B65D 81/2038 | 220/203.01 |

* cited by examiner

EXPANDABLE AND COLLAPSIBLE LID SYSTEM AND METHOD

CROSS-REFERENCE TO RELATED APPLICATION(S)

The present application is a Continuation-in-Part application of U.S. patent application Ser. No. 16/391,273 and is related to and claims priority to U.S. Provisional Patent Application No. 62/660,672 filed Apr. 20, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of storage containers and more specifically relates to modifiable volume storage containers.

RELATED ART

Presently the need for storage containers of all sizes has substantially surpassed any such requirement in recorded history. Storage containers for individual food items are commonly utilized in both residential and commercial settings. Options for storage containers are immediately limited to disposable flaccid bags, and reusable fixed volume containers. While disposable bags serve some purposes, they are less than ideal for most uses involving storage of leftover meals. Generally, bags are more suited to store items that are not liquid, and do not need to retain a shape. Plastic containers having a fixed volume are typically used for storage purposes. Many varieties of plastic containers have been developed, yet all have a similar rigid structure comprising a container and accompanying lid. A wide variety of shapes and sizes are provided, each with a lid to match. Unfortunately, given the disparate designs of containers, locating matching lids is a frequent issue. Additionally, if a container is not large enough to retain the desired item, currently it may be necessary to find a larger volume container to store the item. A suitable solution is desired.

U.S. Pat. No. 5,392,941 to Edward S. Robbins Ill relates to a reusable and recollapsible container and associated cap. The described reusable and re-collapsible container and associated cap is a reusable collapsible container having a bottom wall and a relatively flexible, peripheral side wall extending upwardly from the bottom wall, the side wall movable between axially extended and collapsed positions. The side wall includes lower and upper relatively thicker portions and an intermediate relatively thinner portion, and the upper portion joins with an annular rim adapted to receive a removable cap. The intermediate side wall portion is tapered radially inwardly and downwardly, and the lower side wall portion is tapered radially outwardly and downwardly substantially to the bottom wall, such that in a collapsed position, the lower side wall portion is partially telescoped within the upper side wall portion, with the intermediate portion reverse folded therebetween.

U.S. Pat. No. 9,546,032 to Karl Stephen Reilly relates to a storage container with a depressible cover that can create an internal vacuum. In doing so it can reduce it's volume, allowing another similar container to be stored inside the initial container without removing its cover. Through these features, this product's primary aims are to preserve food for longer in a vacuum, thereby reducing waste and drastically reducing the amount of space being used for storage (whether it's food in the refrigerator or clothes in the wardrobe). This product is also available as an airtight cover that can be attached to cans, jars or similar products to provide the ability to simply reseal canned or jarred foods in a vacuum (partial or 100% vacuum) as well as the ability to stack these cans or jars into each other to save storage space. Such airtight covers can also be applied to dishware. While this product has many different designs for different areas, it should be stressed that the functionality of each design remains identical for the purposes of this patent. Therefore, this utility patent relates to a covered storage product that can reduce its internal volume by depression of its cover, which is held in place by a vacuum and can be internally stacked according to the definition of internally stacked above.

SUMMARY OF THE INVENTION

In view of the foregoing disadvantages inherent in the known modifiable volume container art, the present disclosure provides a container including a novel expandable and collapsible lid and method. The general purpose of the present disclosure, which will be described subsequently in greater detail, is to provide an efficient and effective expandable and collapsible lid for use with a corresponding container to store items.

An expandable and collapsible lid system is disclosed herein. The expandable and collapsible lid of the expandable and collapsible lid system may have the capability to operate between an expanded state, a middle state and a collapsed state. The lid includes a flange having a circumscribing lip that may be configured for fluidproof communication with an opening in a corresponding container of the expandable and collapsible lid system. The lid may include a plurality of concentric segments, each concentric segment flexibly coupled, inner-diameter to outer-diameter, with an adjacent segment. Alternatively, the expandable and collapsible lid may be formed from a single piece of material and include folds therein to form the plurality of concentric segments. The expandable and collapsible lid system further includes a container. The container includes an opening that, when releasably covered or closed by the expandable and collapsible lid, defines a volume of the container.

According to another embodiment, a method of using the expandable and collapsible lid system is also disclosed herein. The method includes a first step of providing an expandable and collapsible lid system as described above; matching a lid to a first container; applying a force to concentric segments of the lid to one of collapse or expand the lid; and positioning the lid atop the container to releasably seal the container. The method further includes, when the lid is in a collapsed state, an optional step of nesting a second container within the first container. When the lid is in a middle or expanded state, items may be stored in the container prior to the lid being positioned atop the container, with the lid in the expanded state, the volume of the container is increased and items may fill the container above the opening.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an expandable and collapsible lid system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to modifiable volume containers and more particularly to an expandable and collapsible lid system and method as used to improve storage capabilities and enable varying the volume of containers to provide additional storage.

The expandable and collapsible lid system may include a stackable set of containers. The system provides an extremely portable means of keeping lidded containers organized. A primary function of the expandable and collapsible lid system is the ability to compactly store large volume containers with the lids attached. This functionality allows for volumes of containers to be recessed by a modifiable lid, allowing for stacking of similar sized containers and lids attached thereto in small spaces. Unlike any existing lidded container art, the expandable and collapsible lid system allows lids to remail atop containers while nesting with other containers for storage. The ability to store the containers with the lids attached thereto minimizes the possibility of losing or misplacing the lid when stored. The expandable and collapsible lid system also allows a user to increase the volume of a container by expanding the lid when desired enabling the container to hold an increased amount of an item being stored, the item being able to extend above a rim of the container.

The design of the expandable and collapsible lid system allows for a multitude of uses. In one embodiment the expandable and collapsible lid system may be used with conventionally sized containers to store food. Further embodiments include trash receptacles, storage totes, and commercial packaging. While the function of the present system is clear, the employment of such a system to modify volumes of containers is subject to necessity.

Referring now more specifically to the drawings by numerals of reference, there is shown in FIGS. 1-5, various views of the expandable and collapsible lid system 100.

Figure 1:
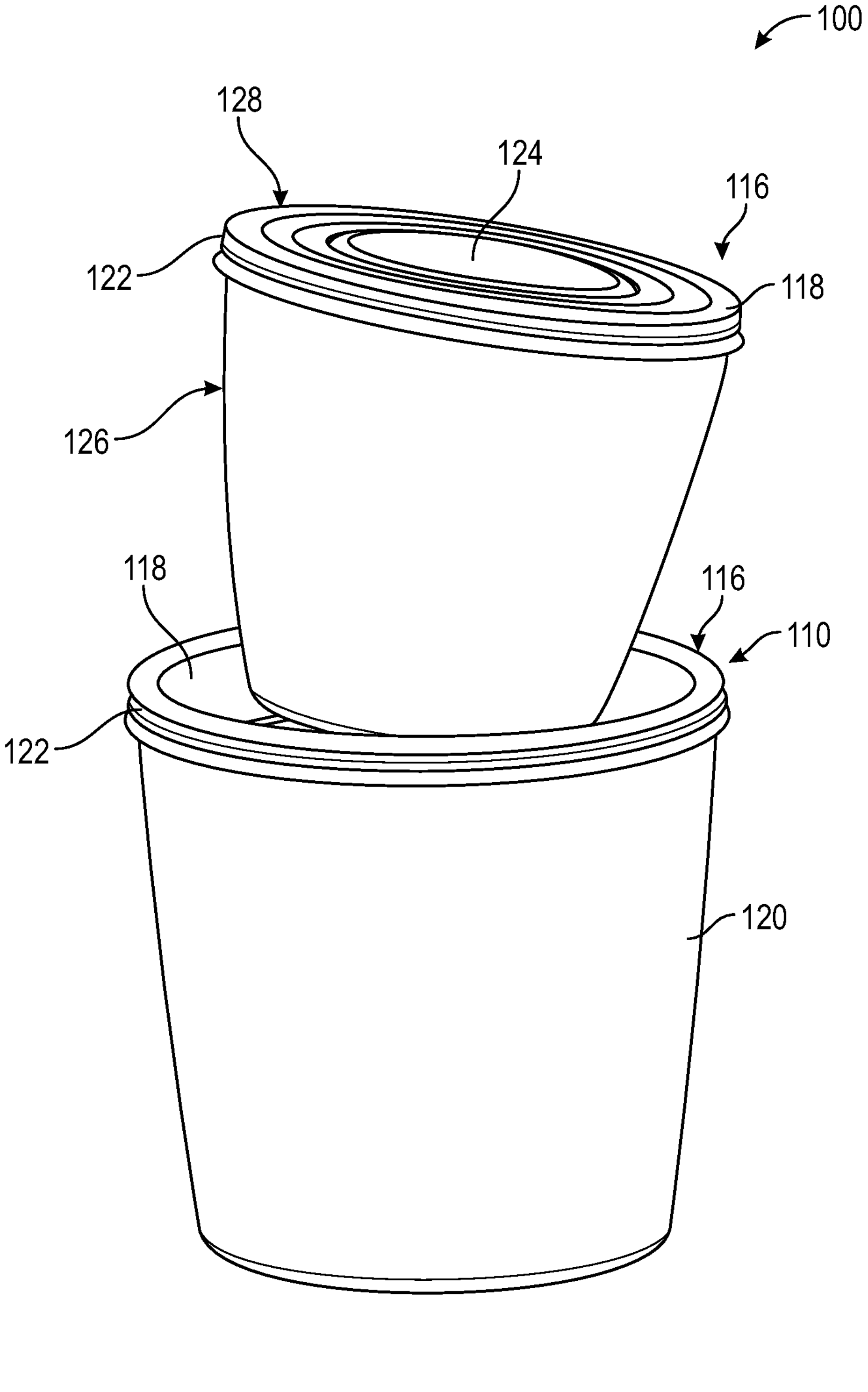
FIG. 1 is a front perspective view of the expandable and collapsible lid system during an 'in-use' condition, according to an embodiment of the disclosure.

FIG. 1 shows an expandable and collapsible lid system 100 during an 'in-use' condition 50, according to an embodiment of the present disclosure. The expandable and collapsible lid system 100 may include at least one container 120 and corresponding lid 110 pair. The container 120 may be a cup, box, receptacle, storage container, or any device used for storing and retaining items therein. The container 120 may include an opening on a top side thereof and the corresponding lid 110 may be of a size and shape able to cover and releasably seal the opening on the top side of the container 120. Here, the expandable and collapsible lid system 100 may be beneficial for varying a storage volume of the container 120. The lid 110 may operate between an expanded state 112 (see FIG. 3A), a middle state 113 (see FIG. 2) and a collapsed state 114 (see FIG. 3B). The lid 110 may include a flange 116 having a circumscribing lip 122 configured for engaging with an edge of the opening in the container 120 to releasably seal the opening in the container 120. The circumscribing lip 122 may have a perimeter or circumference substantially similar to a perimeter or circumference of the opening in the container 120 with which it may be engaged. The lid 110 may be formed from a plurality of concentric segments 118 each flexibly coupled together, inner diameter to outer-diameter, the outer diameter of one concentric segment being substantially equal to the inner diameter of an adjacent concentric segment coupled thereto. The plurality of concentric segments may surround a central section 124. The concentric segments may be individual segments connected together. Alternatively, the lid 110 may be formed from a single piece of material including folds forming the concentric segments being formed in the single piece of material. The circumscribing lip 122 may extend around an outer periphery of the largest concentric segment 118 forming the lid. The concentric segments 118 and central section 124 may be formed from an at least semi-flexible, substantially waterproof material able to retain a liquid or solid within the container 120. The circumscribing lip 122 of the lid 110 may be formed of a semi-rigid material able to engage with and be releasably secured to the container 120 covering the opening. The circumscribing lip 122 may be formed from silicone and/or a more rigid plastic to provide a more stable and durable product. The container 120 including the opening that when releasably sealed by the lid 110 defines a volume for the container 120, the volume being variable based on whether the lid 110 is in the expanded state 112, middle state 113 or collapsed state 114.

According to one embodiment, the expandable and collapsible lid system 100 may include a plurality of container 120 and lid 110 pairs, each container 120 being paired with a corresponding lid 110 having a size able to cover and seal an opening in its respective container 120. The container and lid pairs of the expandable and collapsible lid system 100 may have a plurality of functional relationships in relation to the structure of the expandable and collapsible lid system 100 such that the expandable and collapsible lid system 100 can be used, maintained, or the like, in a preferred manner. FIG. 1 illustrates first and second containers 120, 126, each with a respective lid 110, 128 thereon. The lid 110 of a first container 120 may be in a collapsed state extending into the container 120 being releasably sealed thereby. A second container 126 has a lid 128 positioned thereatop and shown in a middle state forming a substantially flat surface atop the container 126. The second container 126 may be received within the first container 120 and collapsed lid 110, seated above the lid 110 of the first container 120 in a nesting relationship. The lid 128 of the second container 126 may be placed in the collapsed state, similar to the first container 120 and lid 110 pair, for receiving a further container within the second container 126.

Figure 2:
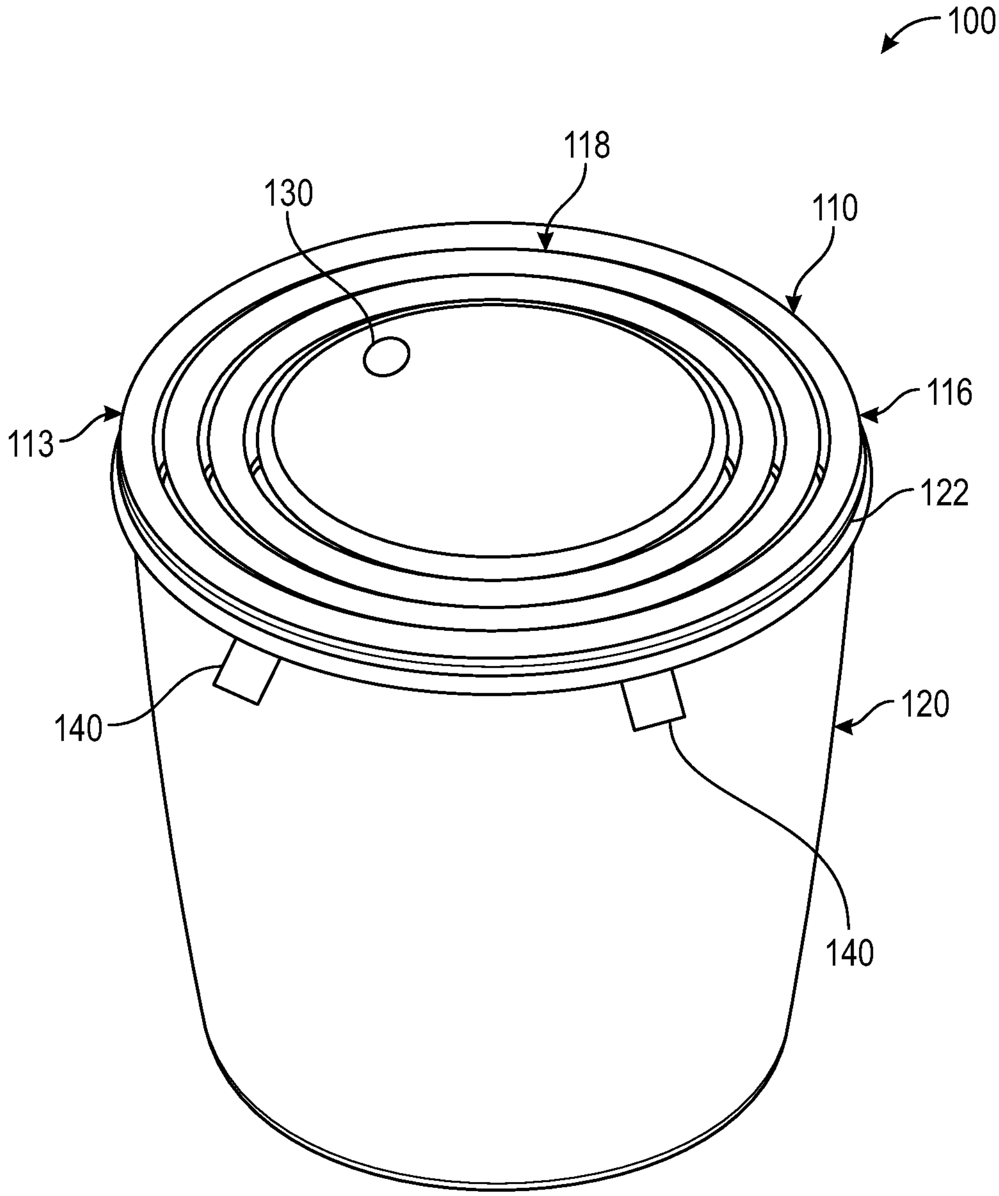
FIG. 2 is a top perspective view of a container and lid pair of the expandable and collapsible lid system of FIG. 1 with the lid in a middle state, according to an embodiment of the present disclosure.

FIG. 2 shows a container 120 and lid 110 pair of the expandable and collapsible lid system 100 of FIG. 1, according to an embodiment of the present disclosure. In FIG. 2, the lid 110 is shown in the middle state 113 forming a flat top for the container 120. As discussed above, the expandable and collapsible lid system 100 may include the container 120 and corresponding a lid 110 pair. The lid 110 may be operable between an expanded state 112 (see FIG. 3A), a middle state 113 (see FIG. 2) and a collapsed state 114 (see FIG. 3B). The lid 110 may be manipulated between the expanded state, middle state and collapsed state by applying a force to either a top side or bottom side of the lid 110 modifying the position of concentric segments 118 relative to each other. The lid 110 may include a flange 116 having a circumscribing lip 122 configured for engaging with a perimeter of an opening in a container 120 to releasably seal the opening in the container 120. Tabs 140 may extend from the circumscribing lip 122 of the flange 116 at points around a circumference thereof. The tabs 140 may provide assistance in sealing the lid 110 to the container 120 by placing the lid 110 atop the container 120 and applying a force on the tabs 140 towards the container 120. The tabs 140 may also provide assistance in removing the lid 110 from atop the container 120 by grasping the tabs 140 and applying a force away from the container 120. Various embodiments of the tabs 140 may include any suitable means to assist in securing the lid 110 to the container 120 and removing the lid 110 from atop the container 120. Noted embodiments of the interaction between the lid 110 and the container 120 for releasably securing the lid 110 to the container 120 may include, traction, vacuum, and pressure. Embodiments of the expandable and collapsible lid system 100 that include tabs 140 may have further conceived methods of releasably securing the lid 110 to and removing the lid 110 from the container 120 as future conceived features are developed.

The lid 110 may further include an aperture 130 allowing for venting, enabling steam and/or air to escape the container and prevent contents within the container from becoming soggy. The aperture 130 also facilitates movement of the lid 110 between the expanded state 112, middle state 113 and collapsed state 114 when positioned atop a container 120 providing a passage for air to leave or enter the container 120 depending on the desired state for the container 120 and lid 110 pair. Further, the aperture 130 may be used to remove liquids or solids from within the container 120 for example by pouring out or drinking. The aperture 130 may be sealable, creating a fluid-proof barrier that impedes the passage of solid matter, vapors, liquids, and gasses. The aperture 130 may be useful for adjusting the volume defined by the lid 110 and the container 120 when the lid 110 is in one of an expanded state 112, a middle state 112, and a collapsed state 114. In operation, the lid 110 may be releasably attached to a container 120, the aperture 130 may be opened, the lid 110 may be modified to an expanded state 112, a middle state 113 or a collapsed state 114, and the aperture 130 may then be closed. The aperture 130, when open, may allow for a pressure to equalize when modifying the volume defined by the lid 110 and the container 120. The aperture 130 further may act as a heat and pressure release. The expandable and collapsible lid system 100 may be resistant to heat. The material and design of the expandable and collapsible lid system 100 may endure microwave radiation. Further, the lid 110, and accompanying container 120, may be resistant to cold temperatures. Disparate temperature conditions may be accommodated by the unique composition and method of manufacture. In a standard embodiment, the lid 110 may comprise materials including silicon, plastic, rubber, and combinations thereof. Further conceived compositions are considered using materials suitable for providing an expandable and collapsible lid system 100 as described.

Figure 3A:
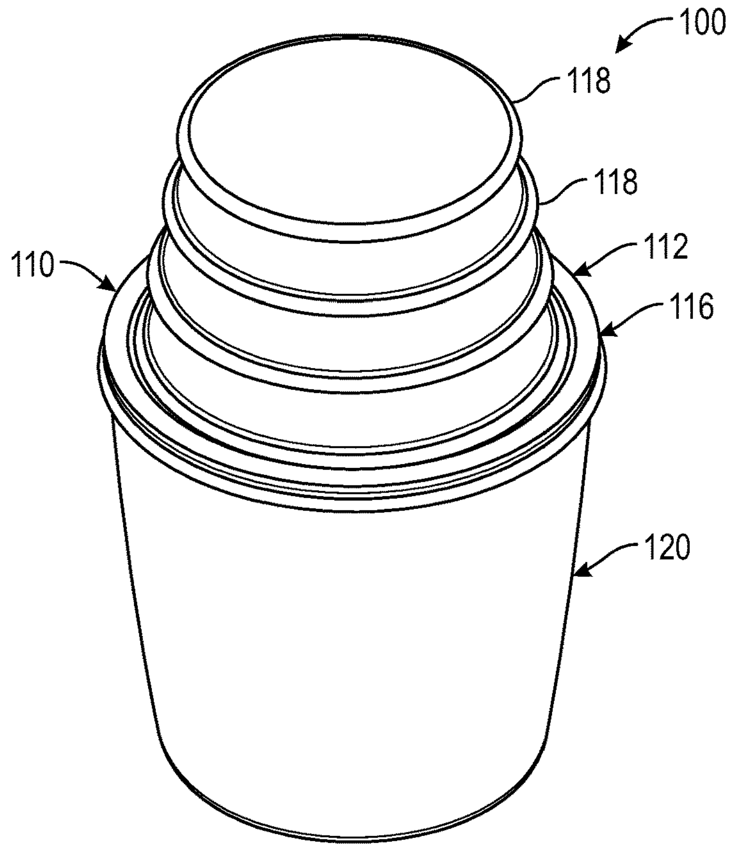
FIG. 3A is a top perspective view of a container and lid pair of the expandable and collapsible lid system of FIG. 1 with the lid in an expanded state.

FIG. 3A illustrates a view of the expandable and collapsible lid system 100 of FIG. 1 with the lid 110 in an expanded state, according to an embodiment of the present disclosure. The lid 110 is expanded so the concentric segments extend above the lip 116 and, when positioned atop the container 120, outwardly from and above the opening in the container 120, thereby increasing the volume defined by the container 120 and the lid 110. In this expanded state, when the lid 110 is positioned to releasably seal the opening in the container 120, the concentric segments 118 are displaced relative to each other, increasing in distance from the container 120 sequentially as the segments decrease in size. In some embodiments, adjacent segments may be connected by a flexible material positioned therebetween facilitating the movement between the expanded state, middle state and collapsed state. Alternatively, the lid 110 may be formed from a single piece of material with folds forming the concentric segment being formed in the material. As shown, while in an expanded state 112, the flange 116 is releasably sealed to a top of the container 120 to cover the opening and form a fluid-proof connection with the container 120.

Figure 3B:
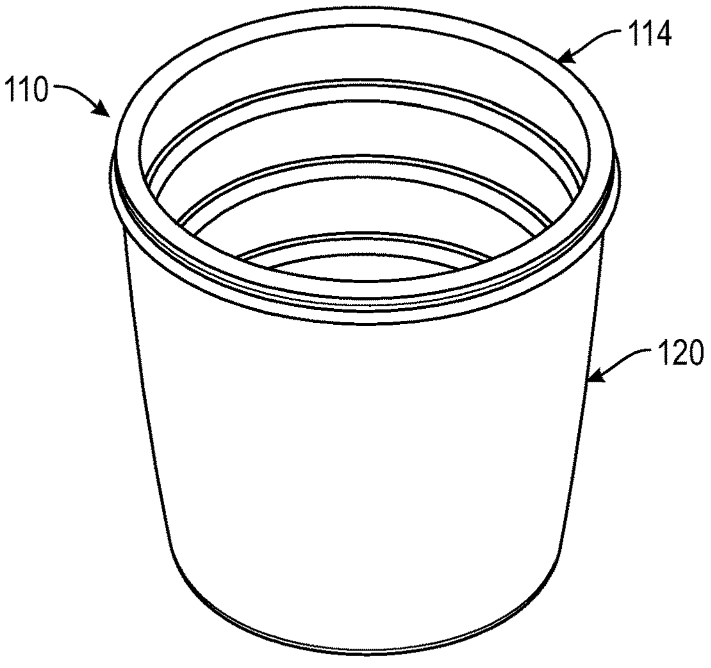
FIG. 3B is a top perspective view of the expandable and collapsible lid system of FIG. 1 with the lid in a collapsed state.

FIG. 3B illustrates a view of the expandable and collapsible lid system 100 of FIG. 1 with the lid 110 in a collapsed state, according to an embodiment of the present disclosure. As shown in FIG. 3B, the lid 110 is collapsed inwardly where the concentric segments extend through the flange 116 and circumscribing lip 122 of the lid 110 and, when positioned atop the container 120, through the opening and into the container 120. In this collapsed state, when the lid 110 is positioned to releasably seal the opening in the container 120, the concentric segments 118 are displaced relative to each other, decreasing in distance from a base of the container 120 sequentially as the segments decrease in size. While in a collapsed state 114, the circumscribing lip 122 of the lid 110 may be releasably sealed to the container 120 forming a pool within the container 120 able to receive a further container and lid pair of the expandable and collapsible lid system 100. When positioned atop the container 120 in a collapsed state, the concentric segments of the lid 110 may be spaced from the walls of the container 120 decreasing the volume inside the container. Shown in FIG. 4, the collapsed state configuration of the lid 110 and container 120 may be useful for stacking multiple container and lid pairs of the expandable and collapsible lid system 100.

Figure 4:
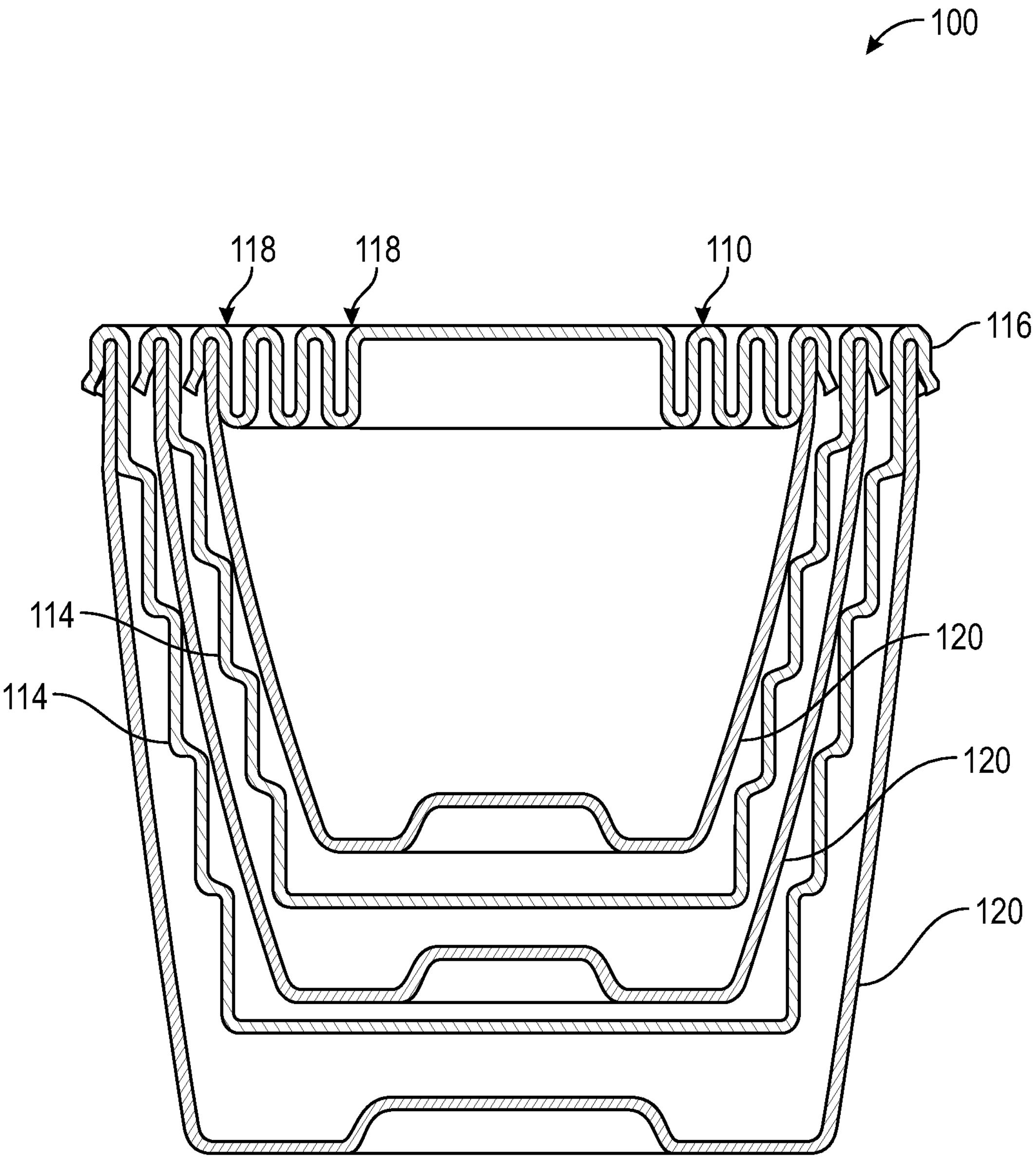
FIG. 4 is a cross section view of the expandable and collapsible lid system of FIG. 1 according to an embodiment of the present disclosure.

FIG. 4 is a cross section view of the expandable and collapsible lid system 100 of FIG. 1, according to an embodiment of the present disclosure. As previously noted, one immediate innovation of the expandable and collapsible lid system 100 system is storage through nestability. Shown here is a view of the expandable and collapsible lid system 100 in a nested configuration. Illustrated are three container 120 and lid 110 pairs of various sizes, each container 120 having a corresponding lid 110 in a collapsed state 114 positioned thereatop and extending into the container. The concentric segments 118 of the lid 110 in a collapsed state 114 are shown as stepped recessions. Each lid 110 is connected to a container 120 while in a collapsed state 114, defining a substantially small volume. The containers are positioned in nesting fashion to reduce the space occupied by the expandable and collapsible lid system 100 when stored.

Figure 5A:
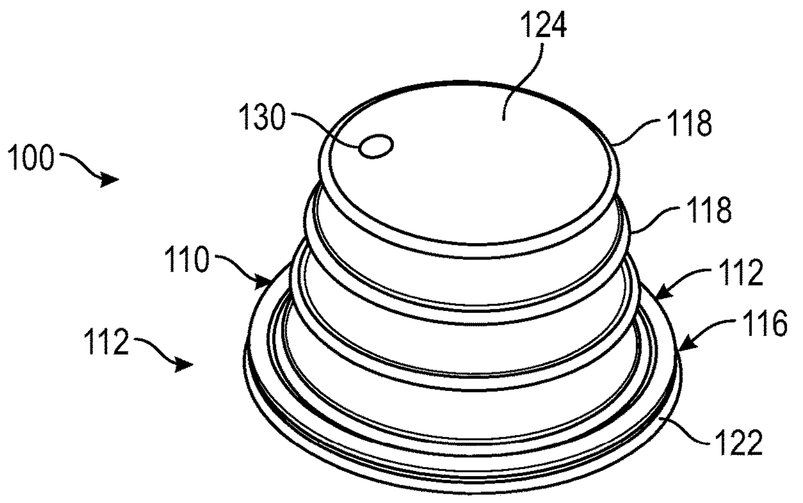
FIG. 5A is a perspective view of the lid of the expandable and collapsible lid system in an expanded state.
Figure 5B:
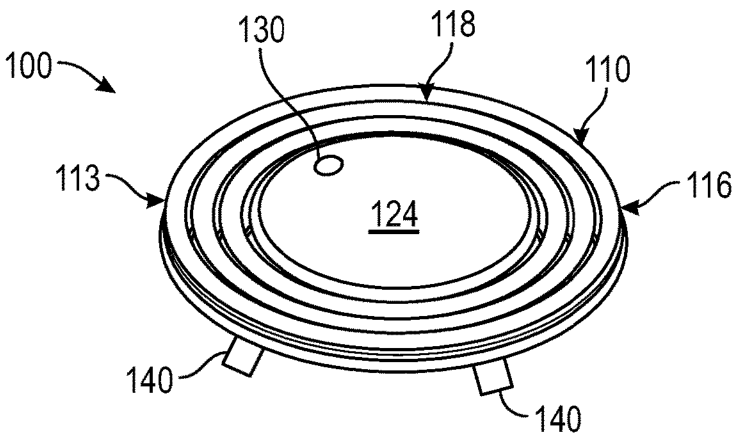
FIG. 5B is a perspective view of the lid of the expandable and collapsible lid system in a middle state.
Figure 5C:
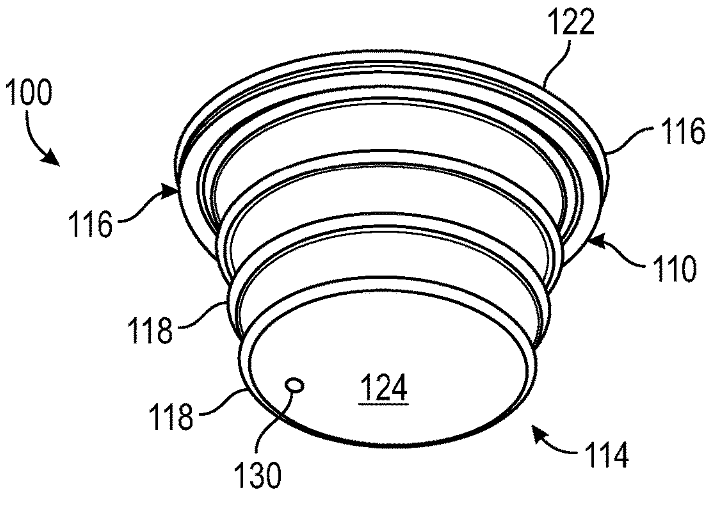
FIG. 5C is a perspective view of the lid of the expandable and collapsible lid system in a collapsed state.

FIGS. 5A-5C show the lid 110 of the expandable and collapsible lid system 100 in an expanded state, a middle state and a collapsed state, respectively. FIG. 5A illustrates a top perspective view of the lid 110 in the expanded state. As can be seen from this view, the concentric segments 118 are displaced from the flange 116, extending above the flange 116 in a direction opposite the lip 122 of the flange 116. When positioned atop a container, the lip 122 will engage the rim of the opening of the container 120 and the expanded concentric segments 118 will extend from the opening of the container in a direction opposite the storage area of the container 120 to increase the storage volume of the container 120 and enable items to be stored within the container 120 and extending above the rim of the container. The concentric segments 118 are displaced relative to each other, increasing in distance from the container 120 sequentially as the segments decrease in size, tapering to the central section 124.

FIG. 5B shows the lid 110 of the expandable and collapsible lid system 100 in a middle state 113 forming a substantially flat surface for covering a container. In this state, the flange 116 and concentric segments may be on a same plane. When in this state and positioned to releasably seal a container, the expandable and collapsible lid system 100 may be used to drink a liquid out of or to store items that are able to fit within the volume defined by the container 120.

FIG. 5C shows the lid 110 of the expandable and collapsible lid system 100 in a collapsed state. As can be seen from this view, the concentric segments 118 are displaced from the flange 116, extending below the flange 116 in a same direction as the lip 122 of the flange 116. When positioned atop a container, the lip 122 will engage the rim of the opening of the container and the collapsed concentric segments 118 will extend from the opening of the container into the storage area of the container to decrease the storage volume of the container and provide a seat for receiving additional container and lid pairs of the expandable and collapsible lid system 100.

While the expandable and collapsible lid system 100 system is illustrated in the present document as being substantially circular in shape, alternative sizes and shapes of the lid(s) 110 may be considered. Shape and size may be defined and manifested through necessity, availability, and function. In the presented embodiments the container and corresponding lid of the expandable and collapsible lid system 100 system may be substantially circular. However, in other embodiments the container and corresponding lid of the expandable and collapsible lid system 100 system may be any known shape able to store the desired items, for example the container may be in the shape of a cube, a rectangle, an oval, pyramidal or any desired shape and the corresponding lid will be of an appropriate shape to releasably seal the opening in the container. Function and usage may also dictate the expandable and collapsible lid system 100 system. For instance, the expandable and collapsible lid system 100 system may be employed as a waste receptacle. Further, the container and corresponding lid of the expandable and collapsible lid system 100 may be of any size able to receive a desired volume of an item, the volume able to be increased or decreased based on the expanded or collapsed size of the corresponding lid.

Figure 6:
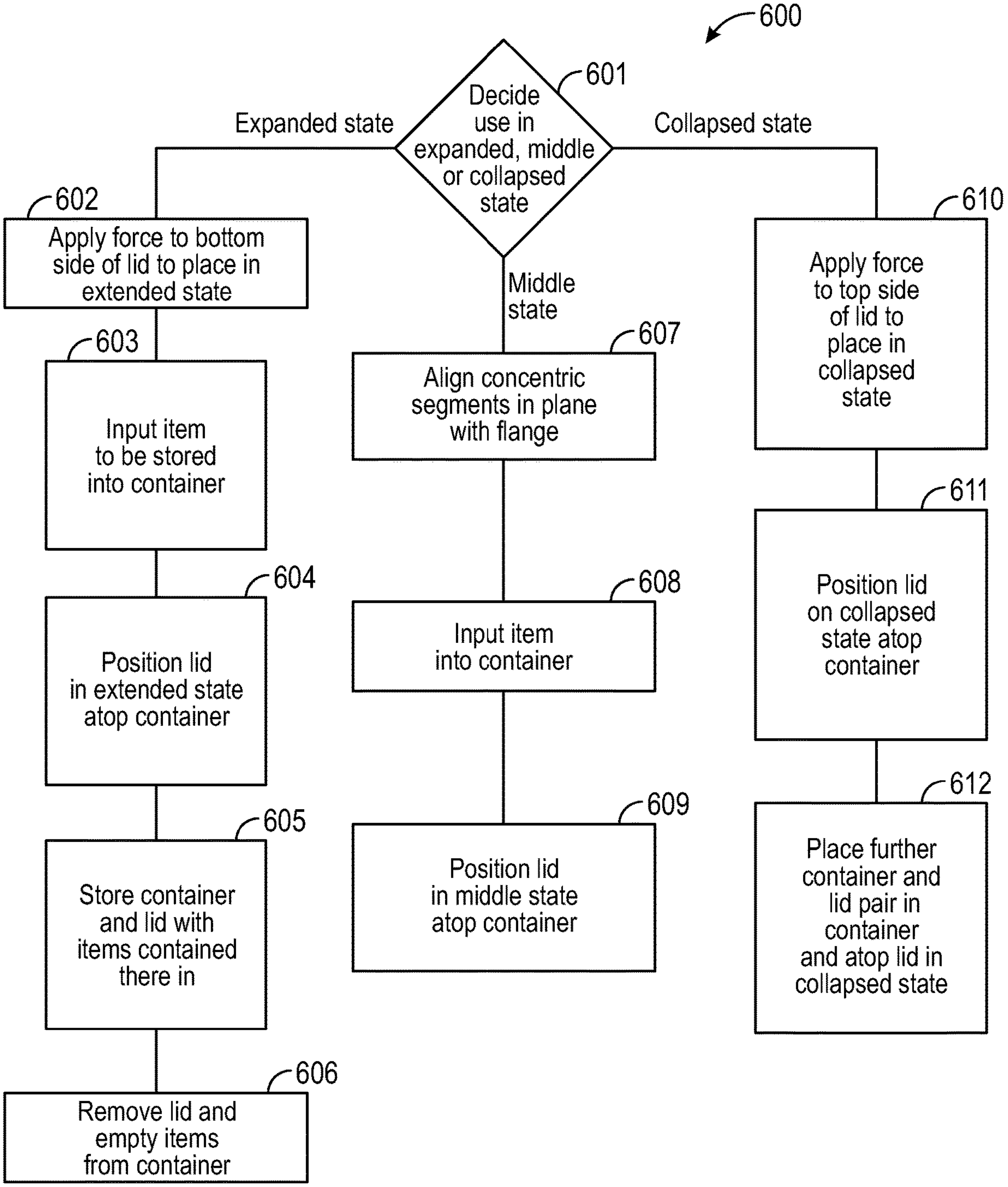
FIG. 6 is a flow diagram illustrating a method of using an expandable and collapsible lid system according to an embodiment of the present disclosure.

FIG. 6 shows a flow diagram illustrating a method 600 for using the expandable and collapsible lid system 100, according to an embodiment of the present disclosure. In particular, the method 600 for using an expandable and collapsible lid system 100 may include one or more components or features of the expandable and collapsible lid 100 as described above. As discussed above, the expandable and collapsible lid system includes at least one container and a corresponding lid pair; the lid is able to operate between an expanded state, a middle state and a collapsed state. The lid may be manipulated to any size between the expanded, middle and collapsed states thereby enabling variation of the volume of the container to any size between the fully collapsed and fully expanded states. The lid 110 may include a flange 116 having a circumscribing lip 122 configured for releasably sealing an opening in the container 120, the lid 110 may also include a plurality of concentric segments 118, each concentric segment being flexibly coupled, inner-diameter to outer-diameter, with an adjacent concentric segment, a diameter of the concentric segments decreasing inversely with the distance of the concentric segment from the flange 116. The container includes the opening for receiving items to be stored therein or other containers when the expandable and collapsible lid system is to be stored away. Positioning the lid atop the opening in the container so a lip of the flange engages a rim of the opening to releasably seal the container defines a volume of the container.

As illustrated, the method 600 for using an expandable and collapsible lid system 100 may include determining whether the expandable and collapsible lid system will be used in an expanded state, a middle state or a collapsed state in step 601. If it is decided to use the expandable and collapsible lid system in an expanded state, a force may be applied to a bottom side of the concentric segments of the lid causing the concentric segments to be displaced to extend from the flange in a direction opposite the lip as described in step 602. An item to be stored by the expandable and collapsible lid system may be placed in the container as described in step 603. The item to be stored in the container may extend above the opening in the container. The lid may be placed over the container causing the lip of the flange to engage with and form a releasable seal with the rim of the opening in the container. In the expanded state, the concentric segments may extend above the container to increase a storage volume of the container and accommodate and store any items extending above the opening in the container as discussed in step 604. The container and lid pair may now be stored away with the items contained therein as stated in step 605. When it is desired to use the items stored by the container and lid pair, the lid may be removed from the container and the items removed as described in step 606.

If it is decided to use the expandable and collapsible lid system in a middle state such as when drinking a liquid from the container, the concentric segments may be aligned in an even plane with the flange to form a substantially flat lid as discussed in step 607. An item to be stored by the expandable and collapsible lid system may be placed in the container as described in step 608. The lid may be placed over the container causing the lip of the flange to engage with and form a releasable seal with the rim of the opening to seal the item such as a liquid within the container as discussed in step 609. The items in the container may be stored away or if a liquid drink is stored in the container, a user may drink the liquid from the container through a recess in the lid.

If it is decided to use the expandable and collapsible lid system in a collapsed state such as when storing the container and lid pairs, a force may be applied to a top side of the lid forcing the concentric segments through the flange and displaced to extend from the flange in a same direction as the lip as described in step 610. The lid may then be placed over the container causing the lip of the flange to engage with and form a releasable seal with the rim of the opening such that the concentric segments extend into the container forming a pool therein as discussed in step 611. A further container and lid pair may then be placed within the container in a nested position atop the lid in the collapsed state as stated in step 612. If it is desired to nest further container and lid pairs within the container, the lid of each container and lid pair may be placed in a collapsed state and positioned atop its corresponding container to form a seat within the container for a further container. The further container may then be positioned within another container and lid pair having the lid in a collapsed state.

It should be noted that the steps described in the method of use can be carried out in many different orders according to user preference. The use of "step of" should not be interpreted as "step for", in the claims herein and is not intended to invoke the provisions of 35 U.S.C. 112(f). It should also be noted that, under appropriate circumstances, considering such issues as design preference, user preferences, marketing preferences, cost, structural requirements, available materials, technological advances, etc., other methods for using an expandable and collapsible lid system, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An expandable and collapsible lid system comprising at least one lid, wherein:

a) said lid is operable between one of an expanded state, a middle state and a collapsed state;

b) said lid includes a flange having a semi-rigid circumscribing lip to engage a rim of a container for releasably sealing an opening of a container, and a plurality of concentric segments each concentric segment being flexibly coupled to an adjacent concentric segment, inner-diameter to outer-diameter, a diameter of the concentric segments decreasing inversely with the distance of the concentric segment from the flange, a concentric segment having a largest diameter being flexibly coupled to the flange, wherein the flange and circumscribing lip define a flexible periphery corresponding to a periphery of the opening of a container;

c) said lid increases storage volume of the container when positioned atop the container in an expanded state; and d) said lid does not include an additional aperture located in a central section of said lid.

2. The expandable and collapsible lid system of claim 1, wherein said lid is formed of at least one of silicon, plastic or any combination thereof.

3. The expandable and collapsible lid system of claim 1, wherein said lid is resistant to heat.

4. The expandable and collapsible lid system of claim 1, wherein said lid is resistant to cold.

5. The expandable and collapsible lid system of claim 1, wherein said lid comprises tabs extending from said lip for assisting in securing the lid to said container and removing said lid from said container.

6. The expandable and collapsible lid system of claim 1, wherein said opening in said container is one of round, square, rectangular, oval and triangular and said corresponding lid is one of round, square, rectangular, oval and triangular.

7. The expandable and collapsible lid system of claim 1, wherein said container is a waste receptacle.

8. The expandable and collapsible lid system of claim 1, wherein said plurality of concentric segments are foldably coupled together.

9. The expandable and collapsible lid system of claim 1, wherein the system further comprises at least one container including an opening on one side thereof.

10. The expandable and collapsible lid system of claim 1, wherein in said expanded state, said concentric segments of said lid are displaced relative to each other to extend from the flange in a direction opposite the lip, said lid in said expanded state increasing a volume of a container on which it is releasably sealed.

11. The expandable and collapsible lid system of claim 1, wherein in said collapsed state, said concentric segments of said lid are displaced relative to each other to extend from the flange in a same direction as the lip, said lid in said collapsed state being received within said container being releasably sealed by said lid forming a pool for receiving a further container and lid pair for storage of said expandable and collapsible lid system.

12. The expandable and collapsible lid system of claim 1, wherein in a middle state, said concentric segments of said lid are aligned in a plane with said flange.

13. The expandable and collapsible lid system of claim 1, wherein said lid is formed of a single material and said concentric segments are formed by folds in the single material.

14. The expandable and collapsible lid system of claim 1, wherein said plurality of concentric segments are formed from a single piece of material and said concentric segments are formed from folds in said single piece of material.

15. The expandable and collapsible lid system of claim 1, wherein said lid may be operable in any position between said expanded state, said middle state and said collapsed state.

16. The expandable and collapsible lid system of claim 1, wherein said lid container is a food storage container.

17. The expandable and collapsible lid system of claim 1, wherein items fill a container above the container opening and enclosed within said lid in an expanded state positioned atop the container.

* * * * *